United States Patent [19]

Baldwin

[11] Patent Number: 4,774,901

[45] Date of Patent: Oct. 4, 1988

[54] SAILBOARD CONSTRUCTION

[75] Inventor: Donald C. Baldwin, Hood River, Oreg.

[73] Assignee: Gorge Technology, Inc., Hood River, Oreg.

[21] Appl. No.: 98,708

[22] Filed: Sep. 18, 1987

Related U.S. Application Data

[63] Continuation of Ser. No. 827,242, Feb. 6, 1986, abandoned.

[51] Int. Cl.$^4$ .............................................. B63H 9/08
[52] U.S. Cl. .................................... 114/39.2; 114/91; 114/109
[58] Field of Search .................... 114/39.2, 97, 98, 91, 114/102, 104, 105, 108, 109; 403/108, 109

[56] References Cited

U.S. PATENT DOCUMENTS 3,040,690  6/1962  Harless ................................ 114/108
3,336,060  8/1967  Bradford ............................. 403/108

FOREIGN PATENT DOCUMENTS 0053726  6/1982  European Pat. Off. ........... 114/39.2
2492764  4/1982  France ................................ 114/102

OTHER PUBLICATIONS

Windsurfing (The Complete Guide) by Clea Taylor, McGraw-Hill; pp. 26, 27, 28, 29, 30 & 31, 1979.
Advertising Brochure by Fleetwood, 200-27th St. Sacramento, CA 95816.

Primary Examiner—Sherman D. Basinger
Attorney, Agent, or Firm—Klarquist, Sparkman, Campbell, Leigh & Whinston

[57] ABSTRACT

A sailboard is disclosed of the type having a mast pivotally connected to a board, a boom connected at one end to the mast and a sail tensioned by out haul and down haul lines. A down haul tie down mechanism is provided for receiving and securing the down haul line at a location adjacent to the sailboard pivot. A cup with a special release mechanism is provided for releasably connecting the mast to the pivot. Release mechanisms for releasably interconnecting other sailboard components, such as boom sections and boom extensions, are also disclosed.

18 Claims, 2 Drawing Sheets

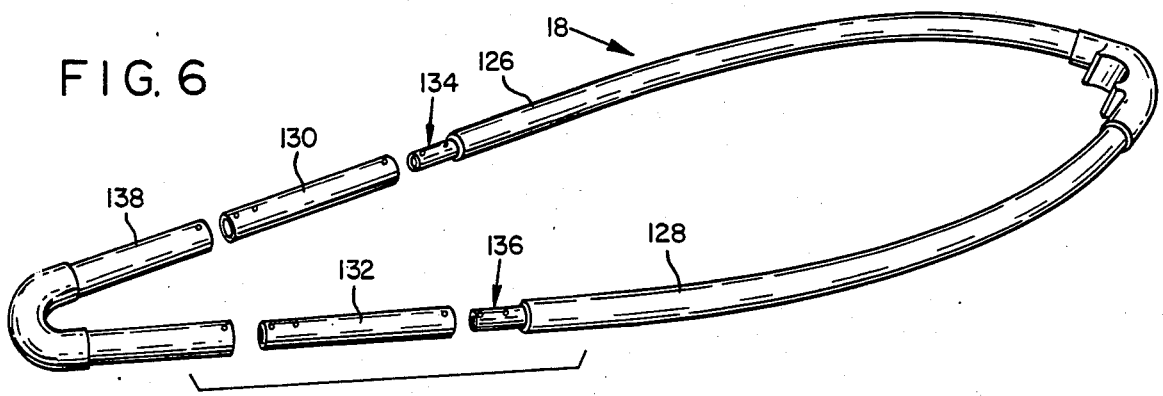
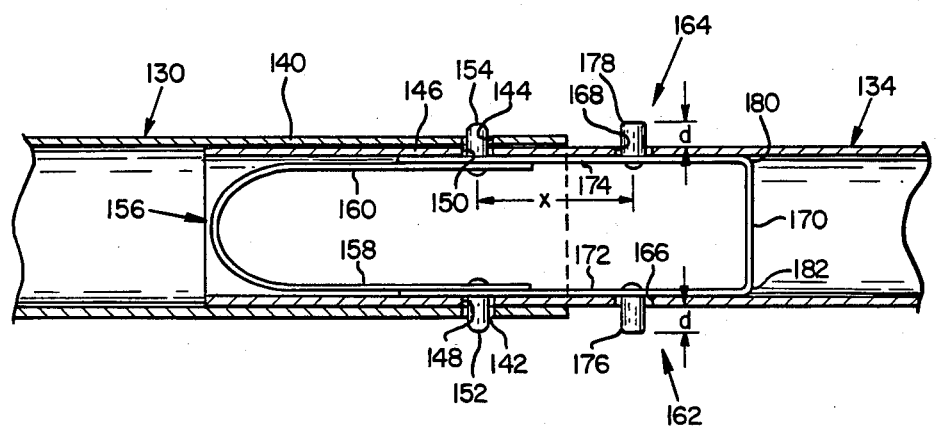
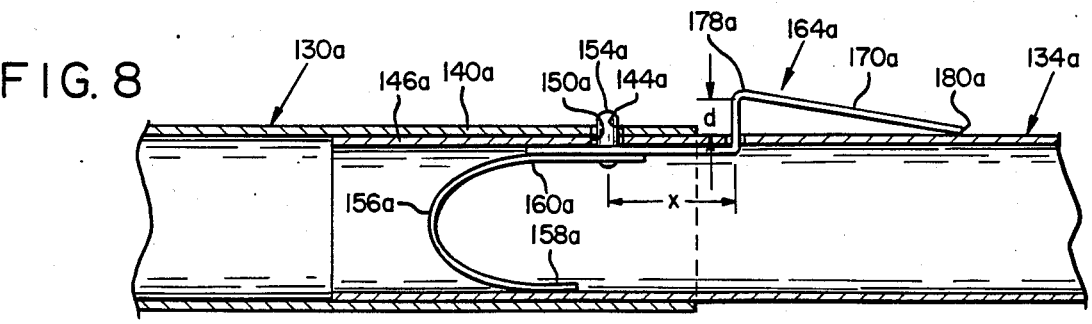
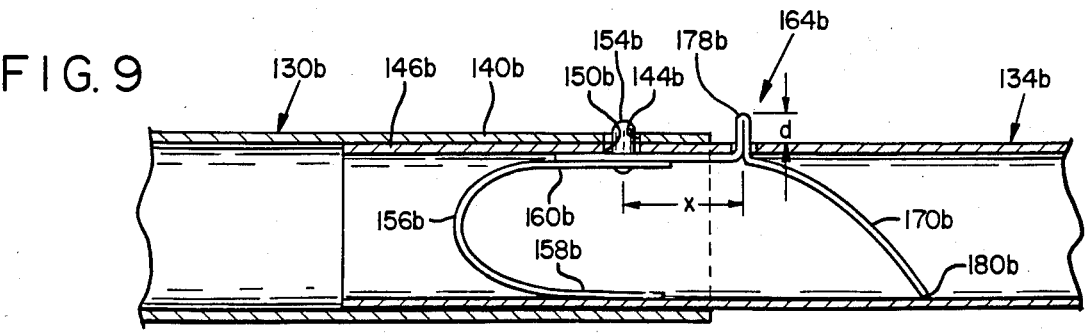

SAILBOARD CONSTRUCTION

This application is a continuation of application Ser. No. 06/827,242, filed 2/06/86 and now abandoned.

The present invention relates to sailboards and more specifically to improved sailboard constructions and sailboard components.

BACKGROUND OF THE INVENTION

Sailboarding is a sport which is growing in popularity. Perhaps this is due to the fact that sailboarding is not confined to only a relatively few sites, but can be enjoyed virtually anywhere where there a body of water and wind. As with any growing sport, a need exist for improving the equipment utilized in this sport. This need is particularly great with respect to sailboards used in races or other competitions.

In general, a conventional sailboard includes a board or boat to which a sail-supporting mast assembly is pivotally secured by a universal pivot or power joint. A boom is connected at one end to the mast and extends aft at about shoulder height of a user. An out haul line is connected from a lower aft portion of the sail and an aft portion of the boom. In addition, a down haul line is typically connected from a lower fore portion of the sail to a cleat mounted to the lower end of the mast or to a mast extension used to extend the length of the mast. The sail is tensioned by tensioning the out haul and down haul lines. During use, the sailboard is steered by moving the boom so as to adjust the position of the sail relative to the wind.

At times it becomes necessary to disconnect the mast from the board. For example, the wind may become stronger while a sailboard user is sailing and may reach a level which is beyond the skill level of the user. In such a case, depending upon the circumstances, the user may be forced to disconnect the mast from the board, and roll up the sail. The mast and rolled up sail may then be conveniently placed on the board as the user paddles to shore. Also, the mast is typically disconnected from the board during transportation to a sailboarding site.

Prior art mechanisms for releasably connecting the mast to the board are somewhat inconvenient and difficult to operate. This makes it more difficult to install and remove the mast, particularly when a user's fingers are numbed by cold water or wind. In addition, known mechanisms for releasably interconnecting other sailboard components, such as booms and boom extensions, suffer from similar drawbacks.

Also, some prior art mechanisms for securing the down haul line during tensioning of a sail can make such tensioning difficult. In addition, prior art down haul line securing devices do not maximize certain efficiencies of sail board performance.

Therefore, a need exists for improved sailboard constructions and sailboard components directed toward overcoming these and other problems of prior art sailboard devices.

SUMMARY OF THE INVENTION

It is an overall object of the present invention to provide improved sailboard constructions and improved sailboard components.

It is another object of the invention to provide improved mechanisms for releasably interconnecting sailboard components, such as sailboard masts or mast extensions to the sailboard, and such as sailboard booms and boom extensions.

A further object of the present invention is to provide a novel down haul line tie down device which offers these and other advantages:

(a) Closes the gap between the foot of the sail and the deck of the board to thereby improve board speed in flat water (non-surf) environments and make water starts, explained below, easier and faster;

(b) Results in a more balanced sail and eliminates the need for drop footed sails which are sometimes used to close the gap between the foot of the sail and the deck of the board;

(c) Provides an adjustable gap between the foot of the sail and deck of the board to improve the sailboard's adaptability to and performance in both salt water surf and flat (non-surf) water environments;

(d) Provides a straight down haul line lead which eliminates down haul line crossings and accompanying friction;

(e) Facilitates the proper positioning of a boom at a location lower on the mast so as to facilitate use of the sailboard by relatively short users; and (f) Installs easily in both used and new sailboard equipment.

It is still another object of the present invention to provide improved sailboard construction and sailboard components which are durable and relatively easy to manufacture.

These and other advantages, features and objects of the present invention will be apparent with reference to the following description and drawings.

BRIEF DESCRIPTION OF THE DRAWINGS

FIG. 6 is a perspective view of one form of boom utilized in the sailboard of FIG. 1 with boom extensions, the boom being shown in a disassembled state;

FIG. 7 is a sectional view of one form of mechanism for releasably interconnecting components of the boom of FIG. 6;

FIG. 8 is a sectional view of another form of mechanism for releasably interconnecting the components of the boom of FIG. 6; and FIG. 9 is still another sectional view of a still a further form of mechanism for releasably interconnecting the components of the boom of FIG. 6.

DETAILED DESCRIPTION OF PREFERRED EMBODIMENTS

Figure 1:
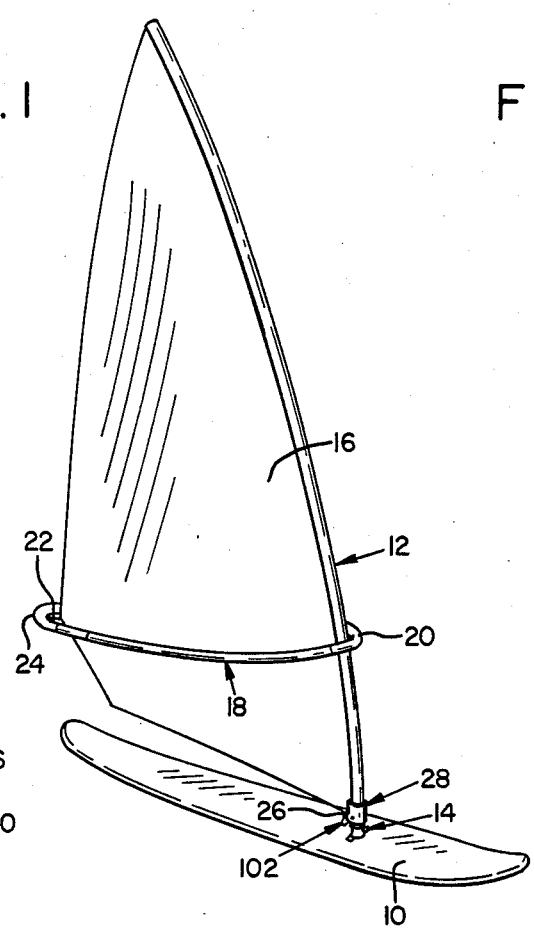
FIG. 1 is a perspective view of a sailboard incorporating improved sailboard components in accordance with the present invention.

With reference to FIG. 1, a sailboard includes a board 10 to which a mast assembly 12 is pivotally connected by a pivot and coupling assembly 14. A sail 16 is provided with a sleeve along its forward edge which slips over the mast assembly 12 to secure the sail to the mast. A boom 18, which may be of a wishbone or airfoil like configuration (See FIG. 6), is connected at its fore end 20, as by ropes not shown, to the mast 12. An out haul line 22 connects a lower aft portion of the sail 16 to the aft or outer end 24 of the boom. Out haul line 22 is used to tension the sail. With certain types of sails, such as RAF sails, approximately eighty pounds of out haul tension is applied. The boom 18 is used to tilt the mast assembly 12 and thus the sail 16 in a desired direction relative to the wind for steering purposes. Preferably, the boom 18 is approximately at a user's shoulder height for better control. A down haul line 26 is also provided and couples a lower fore edge of the sail to a down haul line tie down or securing mechanism 28 described in greater detail below. To properly tension a sail, such as an RAF type sail, as much as eight hundred pounds of tension or more is applied by the down haul line.

Figure 2:
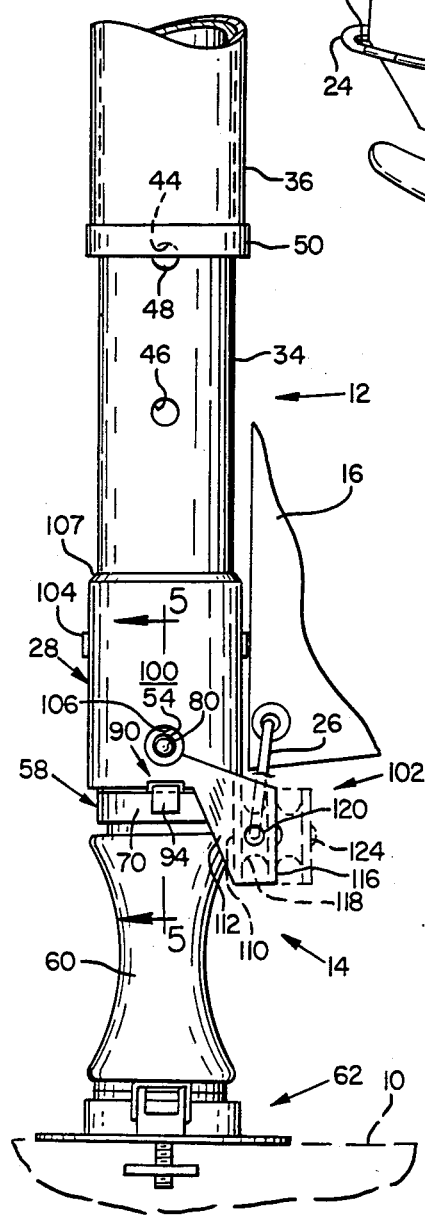
FIG. 2 is an enlarged view of a portion of a mast and mast extension, components utilized to fasten the mast extension to the board, and a down haul line securing mechanism in accordance with the present invention.
Figure 3:
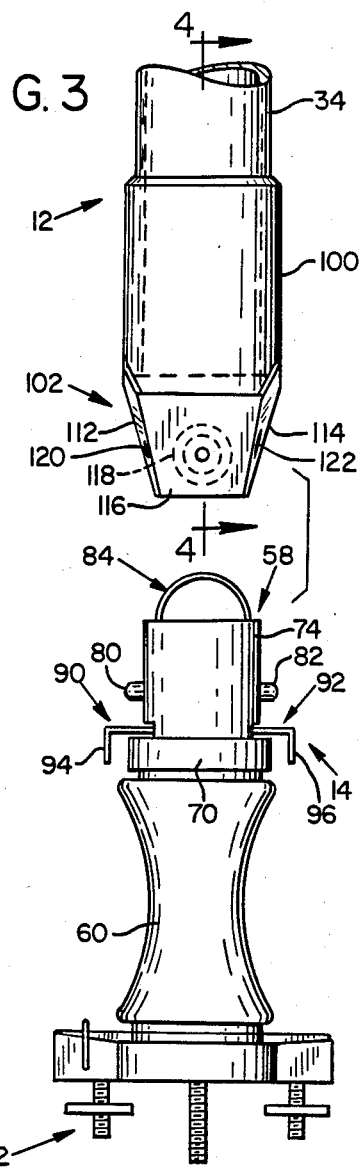
FIG. 3 is a side elevational view of the sailboard components of FIG. 2, taken from a different direction than in FIG. 2, and disassembled for purposes of illustration.

With reference to FIGS. 2 and 3, mast assembly 12 may comprise a unitary mast. However, in the illustrated form, the mast assembly includes a mast extention 34 which is sized for insertion within the lower end of a main mast 36. Typically, mast extension 34 is cylindrical, of circular cross section, and is made of a strong, durable material, such as aluminum. Main mast 36 is of aluminum, fiberglass or other suitable material.

Mast extension 34 is provided with pairs of opposed mast height adjustment openings along its length. One opening of 44 of a first pair and another opening 46 of a second pair are shown in FIG. 2. A pin 48 extends through a selected pair of these openings, in this case the pair which includes opening 44. This pin has semicircular shaped collar supporting projections on each end which project outwardly beyond the outer surface 34 of the mast extension at the sides of the mast extension. The pin projections support a circular collar 50 against which the lower end of the main mast 36 rests when the mast assembly 12 is complete. Thus, the elevation of the main mast 36 and the height of the mast assembly 12 is adjustable to fit various sails depending upon the position of the collar 50.

In addition, another pair of opposed openings 54 (in FIG. 4) and 56 (in FIG. 5) are provided through the lower end of mast extension 34 for purposes explained below. Referring to FIGS. 2, 3 and 5, the pivot and coupling assembly 14 includes an upper cup 58, a universal pivot 60 to which cup 58 is fastened, and a board connection mechanism 62 connected to the pivot 60 and releasably connected to the board 10 for mounting the pivot and coupling assembly to the board. The pivot or power joint 60 is conventional and is usually of a rubberized material. In addition, the board connector 62 is also conventional and for this reason will not be described in detail. Suitable power joints 60 and board connectors 62 are available from a number of companies, such as Fleetwood of Sacramento, Calif.

As shown in FIG. 5, the cup 58 includes a base or collar 70 through which a bolt 72 passes to secure the cup 58 to the upper end of the pivot 60. The cup also includes an upwardly projecting hollow cup wall portion 74 which extends above the base 70. The cup wall is sized for insertion into the hollow interior of mast extension 34. The cup 50 may be of aluminum, stainless steel, zytel plastic or other durable material. A pair of laterally opposed openings 76, 78 are provided through the cup wall 74. First and second catches 80, 82 are positioned to project outwardly through the respective openings 76, 78 to latching positions beyond the outer surface of cup wall 74. A leaf spring 84 has first and second legs 86, 88 extending within the interior of the cup wall. Leg 86 carries catch 80 while leg 88 carries catch 82. The leaf spring 84 biases the catches 80, 82 to their latching positions.

Actuators are provided for deflecting the spring leg portions 86, 88 inwardly toward the center of the cup 58. This shifts the catches 80, 82 to retracted positions in which the catches do not significantly project beyond the outer surface of the cup wall 74. In the illustrated form, these actuators comprise first and second wings 90, 92 which engage the respective spring legs 86, 88. The wing 90 is of stepped construction with a first step section connected to the spring leg 86, an intermediate section which passes through an opening 91 in cup wall 74, and an outer step or downturned flange 94. Wing 92 is of similar shape with a first step section connected to the spring leg 88, an intermediate section which extends outwardly through an opening 93 in the cup wall and an outer downturned flange or step section 96. Openings 91 and 93 are positioned at a location where they are not covered when the mast assembly is mounted to the cup. As a result, the wing 90 and 92, as well as flanges 94 and 96, are readily engageable at times when desired to remove the mast assembly. When wings 90 and 92 are pressed inwardly toward the center of the cup 58, the catches 80 and 82 are moved to their retracted positions. The flanges 94, 96 engage the collar 70 prior to the complete withdrawal of catches 80 and 82 from the openings 76 and 78. As a result, the motion of catches 80, 82 is limited and the catches 80 and 82 are continuously maintained in alignment with the openings 76 and 78.

The above described cup 58 constitutes an easily operated coupler for releasably securing mast extension 34 to the power joint 60 and thus to board 10. That is, to secure the mast assembly 12 to the board, wings 90 and 92 are depressed to shift catches 80 and 82 to their retracted positions. The cup wall 74 is then inserted into the mast extension 34 with the openings 76, 78 aligned with the mast extension openings 54 and 56. The wings 90 and 92 are then released so that the catches 80 and 82 shift to their latching positions. In such positions, catch 80 passes through opening 54 while catch 82 passes through opening 56 to thereby releasably secure the mast extension and mast assembly 12 in place.

Although pins 80 and 82 can manually be pressed to their retracted positions for removal of the mast, this can be difficult. This is particularly true when a user's hands are numbed by cold. However, with flanges 94 and 96 exposed as shown in FIG. 2, the wings 90, 92 may be easily grasped and simultaneously depressed to release the mast assembly 12 and permit its easy removal.

Figure 4:
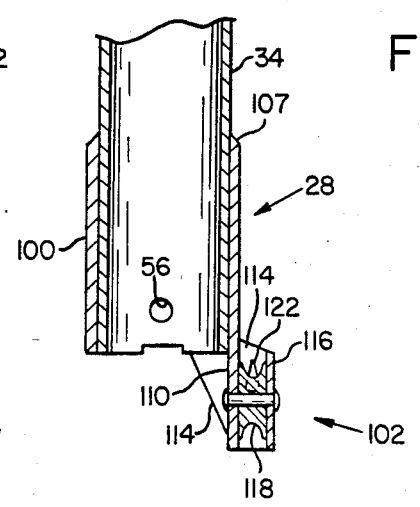
FIG. 4 is a vertical sectional view through the down haul line securing mechanism shown in FIG. 3, taken along line 4—4 of FIG. 3.
Figure 5:
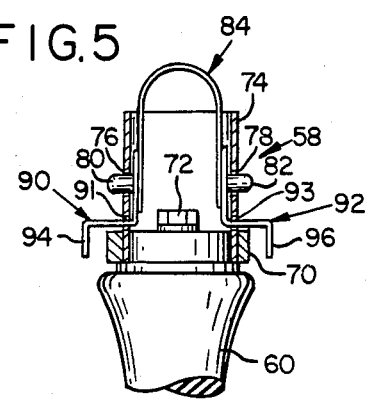
FIG. 5 is a vertical sectional view through a cup in accordance with the present invention for coupling the mast and mast extension to the power joint or pivot of the sailboard, taken along line 5—5 of FIG. 2.

Down haul line tie down mechanism 28 is best shown in FIGS. 2, 3 and 4. Referring to these figures, mechanism 28 includes a main body 100 mounted to the mast extension 34 (or equivalently to cup 58 or to a mast 36 in the event a mast extension 34 is not used) with a down haul line receiving means 102 projecting downwardly from body 100. Thus, with this construction the down haul line receiving means is mounted to the body 100 independently of the mast extension. As shown in FIG. 2, down haul line receiving means 102 projects to a location which is adjacent an upper region of the power joint or pivot 60. As explained in greater detail below, the down haul line 26 is received by the line receiving means 102 and provides a location at which this line may be secured.

More specifically, body 100 may be cylindrical and of circular cross section sized to slip over the end of mast extension 34 (See FIG. 4). Body 100 may be permanently secured, as by rivets, to the mast extension. Alternately, the body may be releasably secured in place by a bolt 104. This releasable connection enables the body 100, and hence the down haul line receiver 102, to be positioned at various locations along the length of the mast extension for purposes explained below. Body 100 is provided with openings 106 (one being shown in FIG. 2) which permit access to the catch pins 80, 82. In addition, openings 106 are typically beveled to facilitate fingertip access to the catches 80, 82. Consequently these pins may be depressed to release the mast assembly 12 from cup 58 in the event the actuators 90 and 92 are not used. These holes as well as other holes in the body are counter sunk to prevent snagging of the sail sleeve on the mechanism. The upper edge 107 of the main body 100 is also beveled to prevent such snagging. Also, instead of a main body 100 which completely surrounds the mast extension 34, a body 100 which only surrounds a portion (i.e. 60 degrees or some other portion) of the mast extension may be used. However, this reduces the strength of the body somewhat.

The illustrated down haul line receiver 102 includes a back or rear plate portion 110 which comprises a downwardly extending section of the main body 100. For added strength, plate 110 curves in the same manner as the portion of the main body to which it is connected. Side plates or flanges 112, 114 project outwardly from the respective side edges of back plate 110. A cover plate 116 extends from plate 112 to plate 114 at a location spaced from the rear plate 110.

As best seen in FIG. 3, the plates 112, 114 and 116 form a cover section and, together with the rear plate 110, form a box like housing which is tapered or narrows toward its bottom. This tapering minimizes possible interference between the housing and movement of the power joint 60.

A down haul line receiving pulley 118 is pivotally secured, as by a rivet, between the plates 110 and 116. In addition, plate 112 is provided with a circular opening for receiving the down haul line within the housing. Plate 114 has an opening 122 with an upper notched cleat for passage of the down haul line outwardly from the housing. When the down haul line is inserted through opening 120, around pulley 118, and outwardly through opening 122, pulling on the down haul line applies downward tension on the sail. In addition, a 4 to 1 purchase is provided with this construction. An additional pulley assembly 124 may be mounted a shown in FIG. 2 to provide a 5 to 1 purchase on the down haul line if desired.

Typically, the down haul line securing mechanism 28 is made of aluminum, nylon, stainless steel or plastic, such as zytel plastic. In addition, the back plate 110 is flared outwardly slightly to provide additional clearance for the power joint 60 and cup 58. Also, the sail hits the board 10 before the down haul line receiver 102 so that the sail prevents receiver 102 from scraping the deck of the board.

With this construction, and with the down haul line tie down mechanism 28 in its lowest position, the lower edge of the sail may be drawn to a height of from three and one half to four inches above the upper deck or surface of the board. In contrast, prior art down haul line securing devices known to applicant are only capable of bringing the lower edge of the sail to within five to five and one half inches of the upper deck of the board. Although it may seem like only a slight difference, the present invention provides significant advantages. It is estimated that this construction improves board speed by at least two knots. In addition, sails attached in this manner seem better balanced and easier to handle. Also, the boom may be lowered slightly when the sail is lowered in this manner so that it is easier for relatively short people to have the boom set at a proper height.

Also, during water starts, a user lays in the water with his or her feet on the deck of the board and with the sail angled upwardly to catch the wind. When properly positioned, the wind lifts the user onto the board as sailing commences. When the gap between the lower edge of the sail and the deck of the board is reduced utilizing the present invention, the sail traps air better during water starts. This improves the lift provided by the wind and permits water starts in lower wind conditions. In addition, the speed of water starts is increased.

Moreover, the straight line passage of the down haul line through the line receiver 102 eliminates crossing of the down haul line. Crossing of a down haul line can add as much as 70 to 90 pounds of friction as the down haul line is tensioned. Furthermore, when sailboarding in surf, it is desirable to have a larger gap (i.e. six inches) between the lower edge of the sail and the deck of the board. Because the down haul tie down mechanism 28 is adjustable along the mast extension 34, it can be raised for use in surf conditions and lowered when desired to use the board in flatter water. This makes the apparatus extremely versatile. Also, with the above construction, in the unlikely event that the down haul pulley 118 breaks, the line is still retained by the notched cleat 122 so that it does not significantly play out. Therefore, a user is still able to maintain control over the sailboard even though the down haul pulley has failed.

With reference to FIG. 6, the boom 18 may comprise a boom of the type having a wishbone end section with first and second side wing portions 126, 128. The length of the boom may be adjusted by coupling an appropriate side boom extension 130, 132 to the respective ends 134, 136 of the boom side wings 126, 128. A boom tail portion is coupled to extensions 130, 132 to complete the boom. The boom extensions are typically interchangeable with other boom extensions to adjust the length of the boom to fit sails of varying widths.

The mechanisms of FIGS. 7 through 9 are provided for facilitating the quick release and assembly of the respective boom extensions 130 and 132 to both the boom tail 138 and boom side wings 126, 128. For purposes of illustration, each of the FIGS. 7 through 9 shows a connection mechanism utilized to connect the end 134 of boom side wing 126 to the boom extension 130. Similar connection mechanisms may be employed to interconnect the other components of the boom.

As shown in FIG. 7, boom extension 130 is hollow and includes an end wall section 140 having a pair of laterally opposed catch receiving openings 142 and 144.

The boom end 134 includes a hollow end wall section 146 sized for insertion within the boom extension end wall 140. Wall 146 has first and second opposed openings 148, 150 which are aligned with the catch receiving openings 142, 144 when the end wall 146 is inserted into extension end wall 140. A latching mechanism is carried by the boom end 134 and includes first and second catches 152, 154 sized for insertion through the respective openings 144, 148 and 142, 150 when these pairs of openings are aligned. A leaf spring 156 is positioned within the interior of end wall 146. Spring 156 has first and second leg spring portions 158, 160 which carry the respective catches 152, 154. The spring 156 biases the catches 152, 154 to latching positions. When in the latching positions, the catches project outwardly beyond the outer surface of wall 146 and through the openings 142, 144 to thereby couple the boom extension 130 to the boom end 134.

Actuators 162, 164 are provided to facilitate the quick release of members 130 and 134. To accommodate these actuators, respective actuator openings 166, 168 are provided through the wall 146 at a location where these openings are exposed when the members 130, 134 are coupled together. The openings 166, 168 are respectively aligned axially with the openings 148, 150. That is, openings 148 and 166 are along a line parallel with the longitudinal axis of the boom side wing 126 and openings 150, 168 are along another similar line. A leaf spring deflector 170 is positioned within the boom end 134. Spring deflector 170 includes a first leg 172 which engages the spring leg 158 and a second leg 174 which engages the spring leg 160. The actuator mechanism 162 includes a first actuator 176 which is connected to the deflector leg 166 and which projects outwardly a distance "d" beyond the outer surface of wall 146. A similar actuator 178 is supported by the deflector leg 174.

When actuators 176, 178 are depressed, spring deflector legs 174, 172 are correspondingly deflected. This causes a similar deflection of spring legs 158, 160 and retracts the catches 152, 154 to their retracted positions. When in their retracted positions, the catches 152, 154 do not project significantly above the outer surface of the wall 146. Therefore, the boom extension 130 may easily be removed from boom end 134. It should be noted that the distance d, that is, the height of the respective projecting portion of each actuator, is typically set so that the corresponding catch is withdrawn below the outer surface of the wall 146, but not totally into the interior of the boom end 134. Consequently, the catches are constantly maintained in alignment with the openings 148, 150.

In the FIG. 7 form of the mechanism, the catch 154 and actuator 178 in effect pivot about a point 180 while the catch 152 and actuator 176 pivot about a point 182. With this relationship, the distance "x" between the actuators and catches is inversely related to the distance. Thus, the greater the distance "x", the smaller the distance d, and vice versa.

The FIGS. 8 and 9 form of connection mechanisms are similar to the FIG. 7 form, except they employ only one catch (i.e. 154a or 154b) and use a leaf spring deflector of a somewhat different configuration. These constructions will not be described in detail because of their similarity to the FIG. 7 construction. However, the operation of these mechanisms will be clearly understood because components of FIG. 8 which correspond to those of FIG. 7 are labelled with the same number except with an added letter "a". Similarly, components of FIG. 9 which correspond to those of FIG. 7 are similarly labelled, except with an added letter "b".

Each of the above mechanisms, like the release mechanism for cup 58, provide an effective and convenient coupling and release device for interconnecting sailboard components.

Having illustrated and described the principles of our invention with reference to several preferred embodiments, it should be apparent to those persons skilled in the art that such invention may be modified in arrangement and detail without departing from such principles. We claim as our invention all such modifications as come within the true spirit and scope of the following claims.

I claim:

1. A sailboard down haul tie down apparatus for receiving the down haul line of a sailboard, the apparatus being adapted for mounting to a sailboard mast means such as a mast or mast extension of the sailboard, the sailboard being of the type in which the mast means is supported by a universal pivot or power joint when the sailboard is assembled for use, the apparatus comprising:
   a body for mounting to the mast means; and
   down haul line receiving means projecting outwardly from the body to a location below the lower end of the mast means for receiving the down haul line, the down haul line receiving means including at least one down haul line receiving pulley means for pivoting about an axis which is below the lower end of the mast means.

2. A sailboard down haul tie down apparatus according to claim 1 in which the down haul line receiving means includes a first plate portion projecting downwardly and outwardly from the body to a location adjacent an upper region of the pivot, a cover plate, means for supporting the cover plate from the first plate portion and at a location spaced from the first plate portion, and the pulley means being pivotally supported by the first plate portion and the cover plate, the pulley means being positioned within the space between the first plate portion and the cover plate.

3. A sailboard down haul tie down apparatus according to claim 1 in which the down haul line receiving means includes a box like housing with a rear panel comprising a projection of the body, first and second side panels projecting outwardly from the rear panel in a direction away from the pivot, and a front panel supported by the outer edges of the side panels, and at least one downhaul line receiving pulley pivotally mounted to the housing for pivoting about an axis extending through the front and rear panels.

4. A sailboard down haul tie down apparatus according to claim 3 in which the first side panel has a first opening through which the downhaul line is inserted within the housing, the second panel having a second opening with a notched boundary through which the downhaul line passes from the housing, the downhaul line being wedged in the notched boundary to temporarily secure the downhaul line in place.

5. A sailboard down haul tie down apparatus according to claim 3 in which the housing is narrower at the bottom than at the top.

6. A sailboard down haul tie down apparatus according to claim 3 in which the body is a cylinder of circular cross section.

7. A sailboard downhaul tie down apparatus according to claim 1 in which the down haul line receiving means projects downwardly from the mast means to a location which is substantially no higher than the upper end of the power joint.

8. A sailboard down haul tie down apparatus according to claim 1 in which the down haul line receiving means projects downwardly from the mast means to a location which is below the upper end of the power joint.

9. A sailboard down haul tie down apparatus according to claim 1 in which the body comprises means for surrounding a substantial portion of the lower end of the mast means.

10. A sailboard down haul tie down apparatus for mounting to the lower end of a mast means such as a mast or mast extenstion of the sailboard comprising:
   a body including mounting means for surrounding a major portion of the mast means for mounting the body to the mast means; and
   down haul line receiving means mounted to the body independently of the mast means and projecting outwardly and downwardly from the body.

11. A sailboard down haul tie down apparatus according to claim 10 in which the down haul line receiving means includes a box like housing with a rear panel comprising a projection of the body, first and second side panels projecting outwardly from the rear panel, and a front panel supported by the outer edges of the side panels, at least one down haul line receiving pulley pivotally mounted to the housing for pivoting about an axis extending through the front and rear panels.

12. A sailboard down haul tie down apparatus according to claim 11 in which the first side panel has a first opening through which the down haul line is inserted within the housing, the second panel having a second opening with a notched boundary through which the downhaul line passes from the housing, the downhaul line being wedged in the notched boundary to temporarily secure the down haul line in place.

13. A sailboard down haul apparatus according to claim 11 in which the housing is narrower at the bottom than at the top.

14. A sailboard down haul tie down apparatus according to claim 11 in which the rear panel is curved.

15. A sailboard construction for securing a downhaul line of a sailboard sail and for securing a sailboard mast means to a universal pivot of a sailboard comprising:
   cup means having a latching means for releasably securing the cup means to the mast means and latch actuator means spaced from the latching means for selectively releasing the latching means from the mast means to thereby release the cup means from the mast means; and
   downhaul line receiving means having at least one downhaul line receiving pulley means supported at a location spaced outwardly from the mast means for pivoting about an axis which is below the lower end of the mast means and for receiving a downhaul line of the sailboard.

16. A sailboard construction according to claim 15 in which the downhaul line receiving means is detachably connected to the cup means.

17. A sailboard construction for securing a down haul line of a sailboard sail and for securing a sailboard mast means to a universal pivot of a sailboard comprising:
   cup means having a latching means for releasably securing the cup means to the mast means and latch actuator means spaced from the latching means for selectively releasing the latching means from the mast means to thereby release the cup means from the mast means; and
   downhaul line receiving means having at least one downhaul line receiving pulley means for pivoting about an axis which is below the lower end of the mast means and for receiving a downhaul line of the sailboard;
   the downhaul line receiving means being open at the bottom for receiving the cup means, the latching means comprising means for selectively coupling the cup means to the downhaul line receiving means, and the downhaul line receiving means being adapted for coupling to the mast means.

18. A sailboard construction according to claim 17 including a universal pivot mounted to the cup means, means for mounting the universal pivot to the sailboard, and a mast extension mounted to the downhaul line receiving means for connection to a sailboard mast.

* * * * *